US010777336B1

(12) United States Patent
Garrett et al.

(10) Patent No.: US 10,777,336 B1
(45) Date of Patent: Sep. 15, 2020

(54) BRANCHING UNIT FOR POWER DISTRIBUTION

(71) Applicant: SubCom, LLC, Eatontown, NJ (US)

(72) Inventors: Lara Denise Garrett, Red Bank, NJ (US); Bruce Nyman, Monroe, NJ (US); Stanley Wisniewski, II, Cream Ridge, NJ (US); Francis C. Bekampis, Wayside, NJ (US)

(73) Assignee: SubCom, LLC, Eatontown, NJ (US)

( * ) Notice: Subject to any disclaimer, the term of this patent is extended or adjusted under 35 U.S.C. 154(b) by 0 days.

(21) Appl. No.: 16/382,761

(22) Filed: Apr. 12, 2019

(51) Int. Cl.
*H02G 9/02* (2006.01)
*H01B 9/00* (2006.01)

(52) U.S. Cl.
CPC ............. *H01B 9/006* (2013.01); *H01B 9/005* (2013.01); *H02G 9/02* (2013.01)

(58) Field of Classification Search
CPC ........... H01B 9/006; H01B 9/005; H02G 9/02
USPC ............ 174/72 R; 385/100, 135, 24; 398/48
See application file for complete search history.

(56) References Cited

U.S. PATENT DOCUMENTS

| | | | | | |
|---|---|---|---|---|---|
| 5,526,157 | A | * | 6/1996 | Kawano | H04B 10/032 398/1 |
| 5,719,693 | A | * | 2/1998 | Tanoue | H04B 10/29 398/105 |
| 5,838,477 | A | * | 11/1998 | Yamamoto | G02B 6/12007 398/105 |
| 6,414,405 | B1 | * | 7/2002 | Schesser | H02J 1/00 307/100 |
| 6,496,626 | B2 | * | 12/2002 | Spagnoletti | H02G 15/14 307/112 |
| 6,895,187 | B1 | * | 5/2005 | Webb | H04Q 11/0005 307/126 |
| 6,934,434 | B1 | * | 8/2005 | Kumayasu | H04Q 11/0005 385/16 |
| 6,934,442 | B2 | * | 8/2005 | Nagel | H04J 14/0201 385/24 |
| 7,085,456 | B1 | * | 8/2006 | Nagel | G02B 6/4441 385/100 |
| 8,401,391 | B2 | * | 3/2013 | Kovsh | H04J 14/0221 398/83 |
| 9,414,134 | B2 | * | 8/2016 | Wang | H04Q 11/0005 |
| 10,003,425 | B2 | * | 6/2018 | Abbott | H04J 14/0204 |
| 10,110,321 | B2 | * | 10/2018 | Muth | H04J 14/0202 |
| 2003/0231516 | A1 | * | 12/2003 | Farrar | H04B 3/44 363/65 |
| 2004/0130215 | A1 | * | 7/2004 | Muramatsu | H02J 4/00 307/69 |
| 2005/0084207 | A1 | * | 4/2005 | Nagel | H04J 14/0201 385/24 |

(Continued)

*Primary Examiner* — Timothy J Thompson
*Assistant Examiner* — Michael F McAllister (57) ABSTRACT

A novel branching unit provided. The branching unit may include a first port for connecting a first power conductor disposed in a first optical cable, a second port for connecting a second power conductor disposed in a second optical cable, and a third port for connecting a third power conductor and a fourth power conductor disposed in a branch cable. The third port may include a first sub-port and a second sub-port. The first sub-port may be configured to connect the third power conductor of the branch cable. The second sub-port may be configured to connect the fourth power conductor of the branch cable.

18 Claims, 8 Drawing Sheets

(56) References Cited

U.S. PATENT DOCUMENTS

| | | | |
|---|---|---|---|
| 2005/0213980 A1* | 9/2005 | Ota | H04B 10/296 |
| | | | 398/84 |
| 2011/0076017 A1* | 3/2011 | Midorikawa | H04J 14/0201 |
| | | | 398/48 |
| 2011/0135310 A1* | 6/2011 | Kovsh | H04J 14/0221 |
| | | | 398/83 |
| 2013/0202285 A1* | 8/2013 | Lecroart | H04B 13/02 |
| | | | 398/1 |
| 2015/0093116 A1* | 4/2015 | Wang | H04J 14/0205 |
| | | | 398/104 |
| 2015/0180603 A1* | 6/2015 | Darling | H04Q 11/0005 |
| | | | 398/49 |
| 2016/0308638 A1* | 10/2016 | Zhang | H04J 14/0205 |
| 2017/0331516 A1* | 11/2017 | Yamaguchi | H04B 3/44 |

* cited by examiner

BRANCHING UNIT FOR POWER DISTRIBUTION

BACKGROUND OF THE INVENTION

Field of the Invention

Embodiments of the present disclosure relate to the field of optical communication systems. More particularly, the present disclosure relates to a branching unit for distributing power within an optical communication system.

Discussion of Related Art

In undersea optical fiber transmission systems, a branching unit is a piece of equipment that may split an optical cable into "branches" to serve more than one destination. For instance, one branch of the branching unit may head for a cable landing point (e.g., a location where the cable makes landfall) while the other branches may continue undersea. For example, the branching unit may incorporate conventional 3-port electrical branching functionality, which may interconnect the power conductors of three cables (e.g., an "east" trunk, a "west" trunk, and a branch cable) as well as a ground connector and manage the connections therebetween.

In a conventional 3-port electrical branching configuration, the branching unit may be configured such that the power conductor of the east trunk is connected to the power conductor of the west trunk while the power conductor of the branch cable is connected to the local sea ground connector. In another conventional 3-port electrical branching configuration, for instance, the branching unit may be configured so that the power conductor of the east trunk (or the west trunk in an alternative configuration) is connected to the power conductor of the branch cable while the power conductor of the west trunk cable (or the trunk east cable in the alternative configuration) is connected to the local sea ground connector.

Numerous problems, however, arise in the above-described conventional 3-port electrical branching configurations when a shunt fault occurs on the cable. A shunt fault may be a type of fault that occurs when the insulation of the cable becomes damaged such that there is a short circuit from the power conductor of the cable to seawater. Typically, during repair, the location of the virtual ground point (which would normally exist approximately halfway along the cable) may be moved to the location of the shunt fault so that the communication system can continue to carry traffic along the cable.

Thus, when a shunt fault occurs in the above-described configurations, the virtual ground point of the transmission cable cannot be moved anywhere along the cable since the power conductor in one of the three cables is always physically connected to a local sea ground connector. Another problem is that power feed equipment (PFE) farthest from the shunt fault must be able to generate additional power required to maintain the operating current running through the power conductor of the cable. As a result, traffic capacity of the system is inherently constrained or limited by this shunt fault recovery condition of the branching unit, which significantly reduces overall communication capacity and efficiency.

SUMMARY OF THE INVENTION

Embodiments of the present disclosure are directed to a new and novel branching unit for distributing power. In one embodiment, the branching unit may include a first port for connecting a first power conductor disposed in a first optical cable, a second port for connecting a second power conductor disposed in a second optical cable, and a third port for connecting a third power conductor and a fourth power conductor disposed in a branch cable. The third port may include a first sub-port and a second sub-port. The first sub-port may be configured to connect the third power conductor of the branch cable. The second sub-port may be configured to connect the fourth power conductor of the branch cable.

In another embodiment, a branching unit may include a first port for connecting a first power conductor disposed in a first optical cable, a second port for connecting a second power conductor disposed in a second optical cable, a third port for connecting a third power conductor disposed in a first branch cable, and a fourth port for connecting a fourth power conductor disposed in a second branch cable.

In another embodiment, a system may include a dual-conductor branching unit, a first branching unit, and a second branching unit. The dual-conductor branching unit may include a first port for connecting a first power conductor disposed in a first optical cable, a second port for connecting a second power conductor disposed in a second optical cable, and a third port for connecting a third power conductor and a fourth power conductor disposed in a first branch cable. The third port may include a first sub-port and a second sub-port. The first sub-port may be configured to connect the third power conductor of the first branch cable and the second sub-port may be configured to connect the fourth power conductor of the first branch cable. Moreover, the first branching unit may include a fourth port for connecting a fifth power conductor disposed in a third optical cable, a fifth port for connecting the first power conductor disposed in the first optical cable, a sixth port for connecting a sixth power conductor disposed in a second branch cable. The second branching unit may include a seventh port for connecting the second power conductor disposed in the second optical cable, an eighth port for connecting a seventh power conductor disposed in a fourth optical cable, and a ninth port for connecting an eighth power conductor disposed in a third branch cable.

DESCRIPTION OF EMBODIMENTS

The present invention is directed to a branching unit configured to distribute electrical power from a branch terminal to each outbound direction (e.g., east, west) of a trunk path. In an exemplary embodiment, a branch cable of the branching unit may be a dual conductor cable ("DCC"), which includes two separate power conductors to power both the east and west trunk cables out of the branching unit. In an alternative embodiment, two separate single-conductor branch cables may be used to provide a 4-port power distribution branching unit. In some examples, one of the two single-conductor branch cables may be configured to provide only electrical power while the other single-conductor branch cable may be configured to provide full optical and electrical functionalities.

As described above, the inherent limitations of a conventional 3-port electrical branching configuration may cause numerous problems that arise during a fault event, such as shunt fault damage. The one or more embodiments, examples, and/or aspects disclosed herein directed to a new and novel type of power distribution branching unit improves and is advantageous over the previously described conventional configurations in numerous ways. For example, none of the optical cables (e.g., east trunk, west trunk, branch cable) associated with the power distribution branching unit are required to be directly powered to ground, which allows shunt fault recovery possible on all paths. Another advantage is that a cable may be divided into two "shunt fault recovery zones," where one zone, for example, may be powered between a PFE at the east terminal and a first PFE at the branch terminal, and the other zone may be powered between a PFE at the west terminal and a second PFE at the branch terminal. Accordingly, PFE voltage requirements for each terminal may be reduced in proportion to the reduction in the length of power flow. Alternatively, full PFE voltage may be used to increase overall path traffic capacity.

The present invention will now be described more fully hereinafter with reference to the accompanying drawings, in which preferred embodiments of the invention are shown. This invention, however, may be embodied in many different forms and should not be construed as limited to the embodiments set forth herein. Rather, these embodiments are provided so that this disclosure will be thorough and complete, and will fully convey the scope of the invention to those skilled in the art. In the drawings, like numbers refer to like elements throughout.

Figure 1:
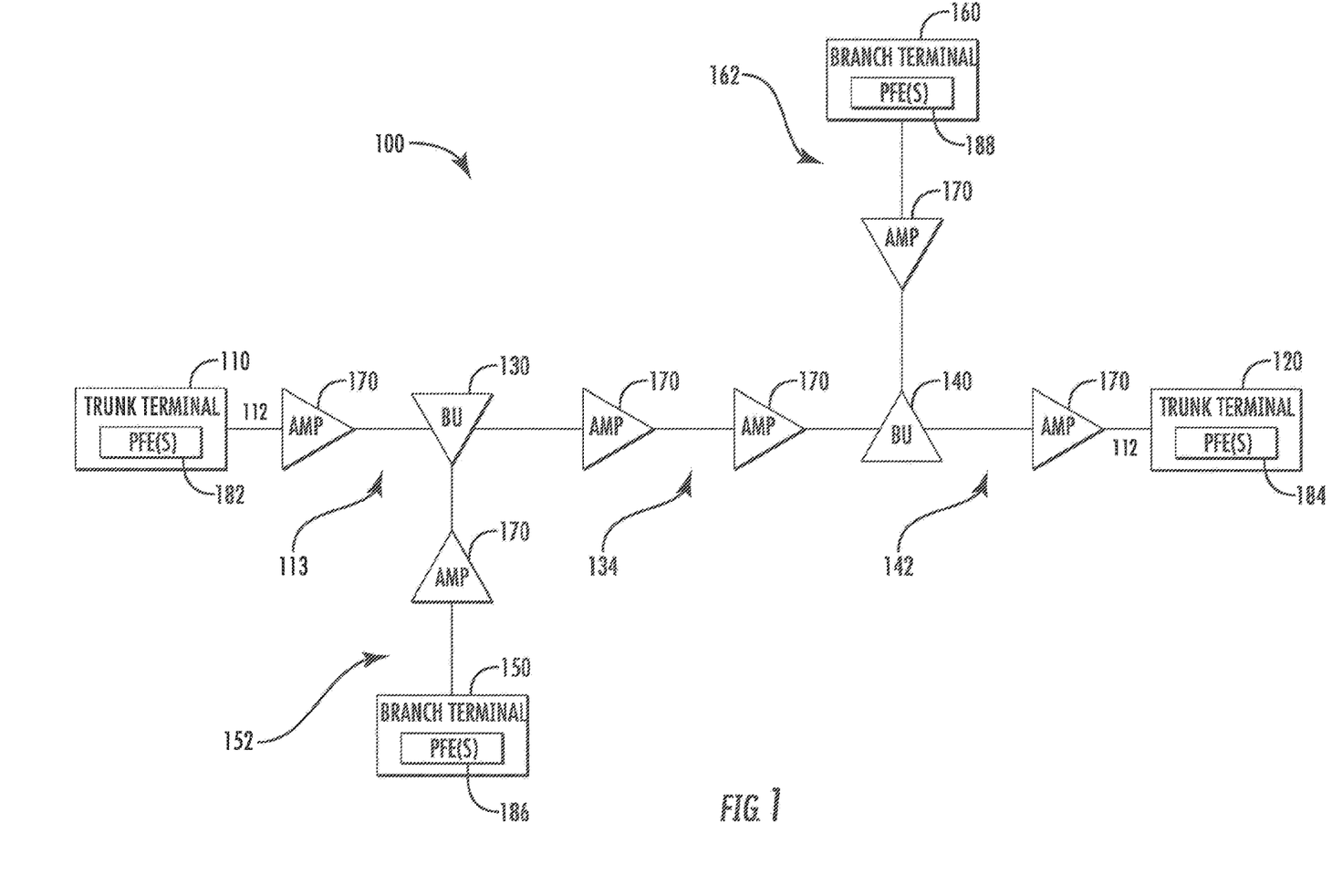
FIG. 1 illustrates an example optical communication system.

Referring to the drawings, FIG. 1 illustrates an example optical communication system 100 according to embodiments. As shown, the optical communication system 100, which may be a long-haul system, includes trunk terminals 110 and 120 that may be coupled to a trunk path 112. The term "coupled" as used herein may refer to any connection, connecting, coupling, linking, link, or the like and does not necessarily imply that coupled components are directly connected to each other. Thus, the connection between coupled components may be indirect. The terms "coupled" and "connect" may be used interchangeably herein. It may be understood that the side where trunk terminal 110 is located may be referred to as the west side and the opposing side where trunk terminal 120 is located may be referred to as the east side.

The trunk path 112 may include a plurality of optical cable segments, e.g., cable segments 113, 134, 142, for carrying optical signals. Each cable segment may include one or more sections of optical fiber cable including optical fiber pairs and one or more repeaters 170 to provide a transmission path for bi-directional communication of optical signals between trunk terminal 110 and trunk terminal 120.

One or more branching units, e.g., branching units (BUs) 130 and 140, may be coupled to the trunk path between the trunk terminals 110 and 120. Each branching unit 130, 140 may be further coupled to a branch terminal, e.g., branch terminals 150 and 160, respectively, through an associated branch path 152, 162, respectively, via for example one or more repeaters 170 and linking optical cables. The optical communication system 100 may thus be configured to provide bi-directional communication of optical signals between terminals 110, 120, 150, and/or 160 using the same trunk fiber pair, although it may be understood that multiple fiber pairs may be used and supported by each of the branching units 130 and 140. For ease of explanation, the description herein may refer to transmission from one terminal to another. This may be understood, however, that the system 100 may be configured for bi-directional or uni-directional communication between any of the terminals 110, 120, 150, and/or 160.

As further shown in FIG. 1, the trunk terminals 110, 120 and the branch terminals 150, 160 may include one or more power feed equipment (PFE), e.g., PFE 182, 184, 186, 188, configured to feed or supply power to the various electronic components, such as the repeaters 170, of the optical communication system 100 via the power conductors (not shown) disposed in the optical cable segments of the trunk path 112 and the branch paths 152 and 162.

Moreover, the components in the trunk and branch paths may include known configurations for achieving their intended functionality. For example, the repeaters 170, may include any known optical amplifier/repeater configuration that compensates for signal attenuation on the transmission path. For instance, one or more of the repeaters 170 may be configured as an optical amplifier, such as an erbium doped fiber amplifier (EDFA), a Raman amplifier, or a hybrid (e.g., Raman/EDFA) amplifier. Further, one or more of the repeaters 170 may be provided in a known optical-electrical-optical configuration that regenerates an optical signal by converting it to an electrical signal, processing the electrical signal, and then retransmitting the optical signal.

As will be further described below, the respective branch cables of the branching units 130 and 140 each may be configured to distribute power provided by the PFEs at the branch terminals 150 and 160, respectively, to both outbound directions, e.g., west, east, of the branching unit. Thus, for example, power provided by PFE 184 may be distributed to the west side of the trunk path 112, e.g., all optical cable segments between trunk terminal 110 and branching unit 130, and the east side of the trunk path 112, e.g., all optical segments between branching unit 130 and trunk terminal 120. Moreover, power provided by PFE 186 may be distributed in a similar manner by the branching unit 140.

Figure 2:
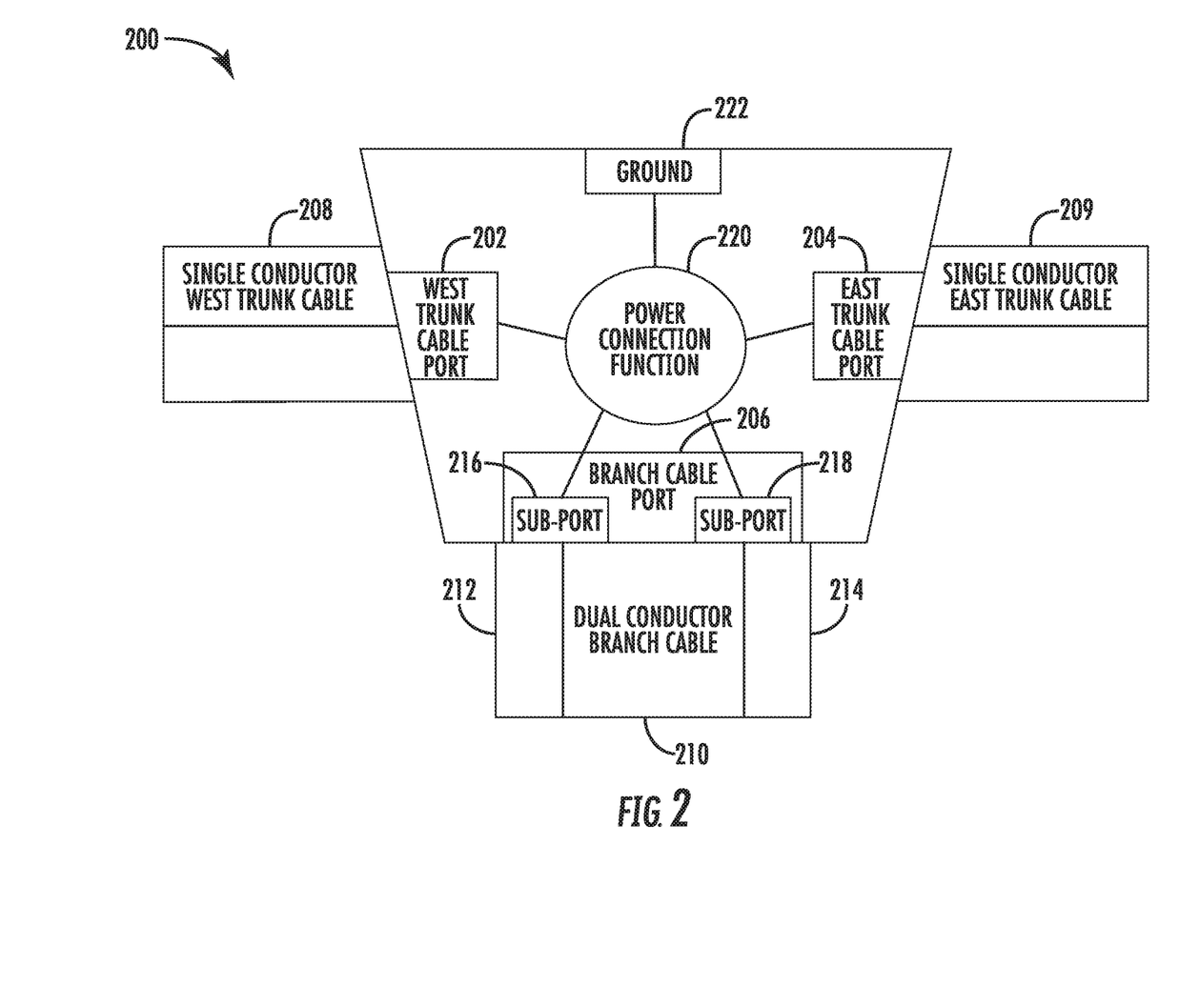
FIG. 2 illustrates an exemplary branching unit.

FIG. 2 illustrates an exemplary branching unit 200 according to embodiments. As shown, the branching unit 200 may include three separate ports, e.g., a west trunk cable port 202, an east trunk cable port 204, a branch cable port 206, each configured to accommodate the connection of a respective optical cable and the power conductor(s) disposed therein. For example, a single conductor west trunk cable 208 may connect to the west trunk cable port 202. On the other side of the branching unit 200, a single conductor east trunk cable 209 may connect to the east trunk cable port 204. Moreover, a dual conductor branch cable 210 may connect to the branch cable port 206. The term "port" may be understood broadly and include any interface or any suitable component that allows a cable (including the power conductor disposed therein) to connect to the branching unit so as to connect to a different cable (including the power conductor disposed therein).

According to an exemplary embodiment, two separate power conductors 212 and 214 may be disposed in the dual conductor branch cable 210. To accommodate the connections of the power conductors 212 and 214, the branch cable port 206 may include two separate sub-ports 216 and 218, respectively. The term "sub-port" may be understood broadly and include any interface, component, and/or technique that allows one of the two power conductors disposed in the dual conductor branch cable to connect to the branch cable port in a separate manner, and further, and is not required to have a separate housing or the like.

A power connection function 220, which may include circuitry (e.g., power connection circuitry), logic, any suitable hardware and/or software, may facilitate the connections among the west trunk cable port 202, the east trunk cable port 204, and the two sub-ports 216 and 218 of the branch cable port 206, and ground 222. For example, the power connection function 220 may connect the west trunk cable 208 and the power conductor 212 of the dual conductor branch cable 210 together via a connection between west trunk cable port 202 and sub-port 216. Similarly, the east trunk cable 209 and the power conductor 214 may be connected via a connection between east trunk cable port 204 and sub-port 214. It may be understood that other numerous connections are possible, as will be further described below.

Figure 3:
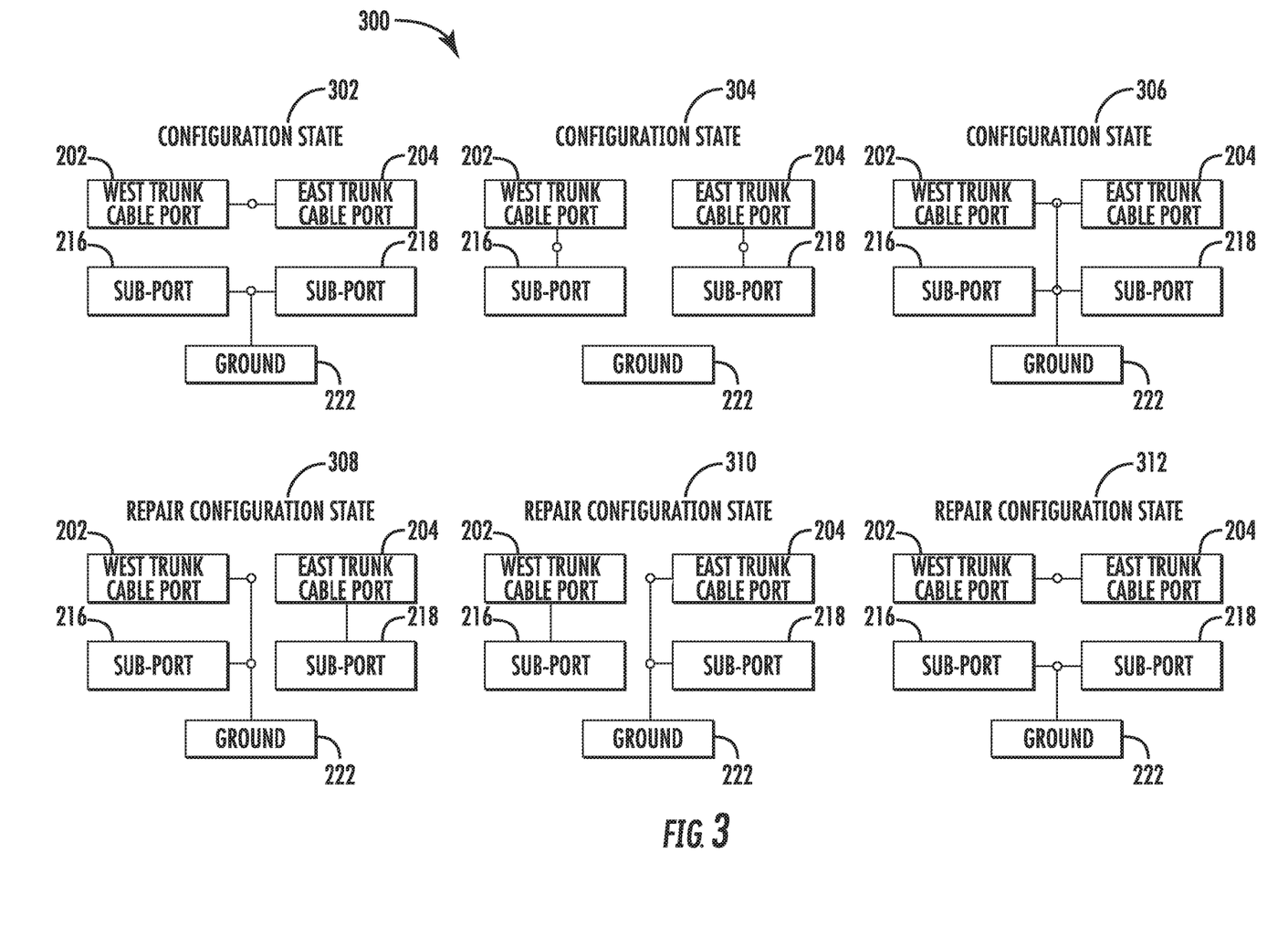
FIG. 3 illustrates example configuration states of a branching unit.

FIG. 3 illustrates example configuration states 300 of a power connection function of a branching unit according to embodiments. For ease of explanation, the power connection function 220 of the branching unit 200 will be used to describe the configuration states 300. For example, the power connection function 220 may configure the ports of the branching unit 200 to connect in a specific manner, e.g., a configuration state, so that the cables associated with those ports connect according to that specific manner. As will be apparent below, the configuration states 300 are possible by way of at least the two power conductors 212 and 214 of the dual conductor branch cable 210.

In configuration state 302, for example, the west trunk cable port 202 and east trunk cable port 204 may be configured to connect so that the single conductor west trunk cable 208 and single conductor east trunk cable 209 connect to each other. The sub-ports 216 and 218 may be connected to ground 222 so that the power conductors 212 and 214 of dual conductor branch cable 210 both connect to ground. Thus, the configuration of the connection of the ports (and sub-ports) by the power connection function 220 control the connections of the power conductors disposed in the cables connected to those ports (and sub-ports).

In configuration state 304, the west and east trunk cable ports 202 and 204 may be connected to sub-ports 216 and 218, respectively, so that the single conductor west trunk cable 208 connects to power conductor 212 and the single conductor east trunk cable 209 connects to power conductor 214. In another example, configuration state 306 may configure all ports, e.g., west and east trunk cable ports 202 and 204, sub-ports 216 and 218, of the branching unit 200 to be connected to ground 222.

As further shown in FIG. 3, the configuration states 300 may also include various configuration states that are related to repair, such as repair configuration states 308, 310, and 312. For example, the power connection function 220 may connect the ports of the branching unit 220 in a specific configuration based on the detection of a fault in the optical communication system, e.g., a shunt fault, and where the fault was detected.

In repair configuration state 308, where repair is being performed on the west trunk cable 208, sub-port 218 may be connected to the east trunk cable port 204 while both the west trunk cable port 202 and sub-port 216 are both connected to ground 222. When repair is being performed on the east trunk cable 209, sub-port 216 may be connected to the west trunk cable port 202 in repair configuration state 310. The east trunk cable port 204 and sub-port 218 may be connected to ground 222. In yet another example, the west and east trunk cable ports 202 and 204 may be connected to each other in repair configuration state 312 when repair is being performed on the dual conductor branch cable 210. And sub-ports 216 and 218 may be connected to ground 222. It may be understood that the configuration states 300 illustrated in FIG. 3 are merely examples and not limited thereto. Numerous other configuration states may be contemplated.

Figure 4:
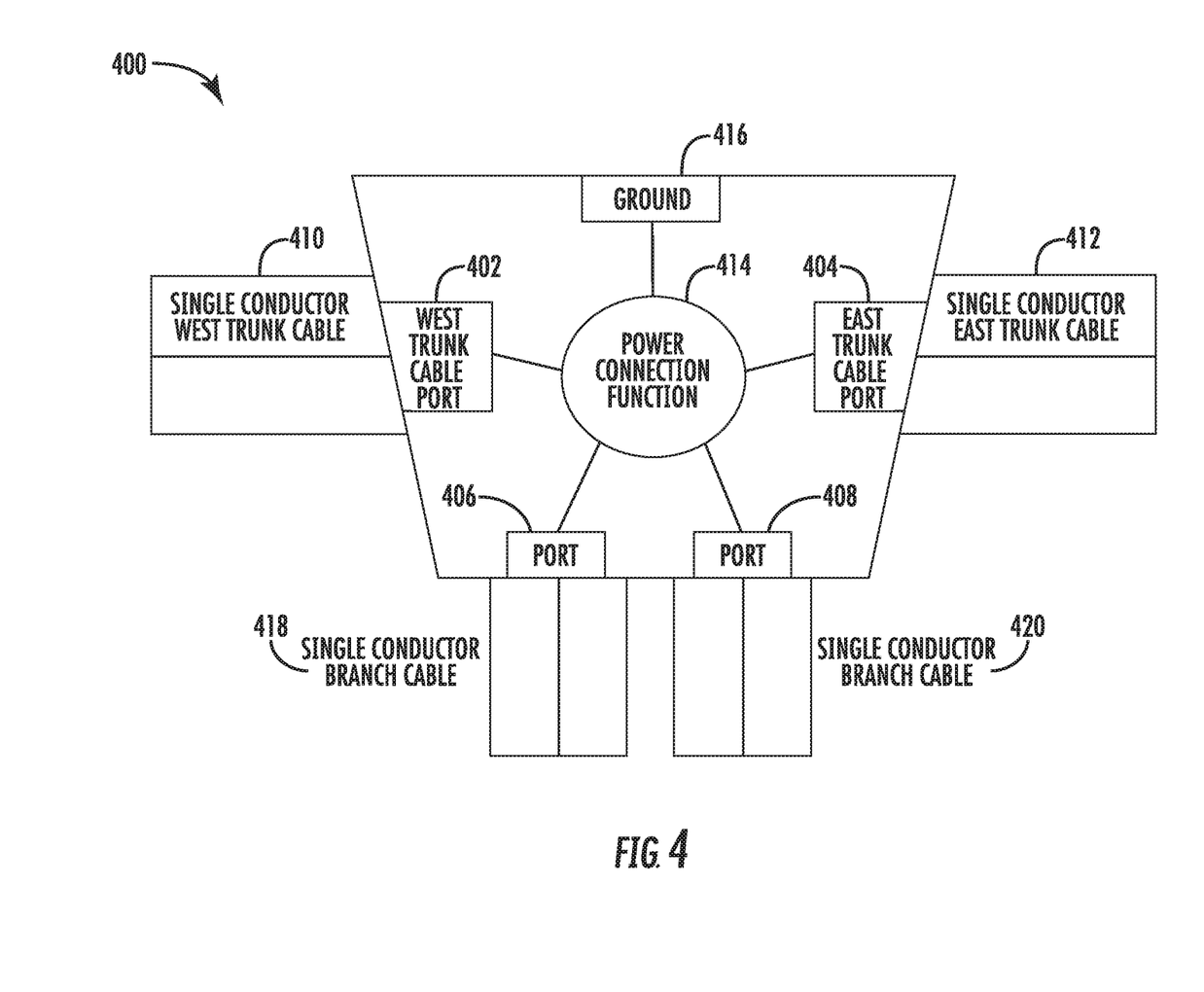
FIG. 4 illustrates an alternative example of a branching unit.

FIG. 4 illustrates an example branching unit 400 according to an alternative embodiment. The branching unit 400, for instance, may include at least four separate ports, e.g., a west trunk cable port 402, an east trunk cable port 404, a branch cable port 406, and a branch cable port 408 that is separate and distinct from the branch cable port 406. As shown, a single conductor west trunk cable 410 and a single conductor east trunk cable 412 may connect to the west trunk cable port 402 and the east trunk cable port 404, respectively. Further, branching unit 400 may include a power connection function 414, which may be similar to the power connection function 220, to facilitate the connection among the various ports and ground 416. It may be understood that the configuration states that are configurable by the power connection function 414 of branching unit 400 may be similar to the above-described configuration states 300.

As described above, the branch cable ports 406 and 408 of the branching unit 400 may be configured or arranged as two physically separate and distinct ports. And two separate single conductor branch cables 418 and 420 (instead of one DCC) may connect to the branch cable ports 406 and 408, respectively. Thus, it may be understood that the branching unit 400 may be referred to as a "4-port" branching unit. The use of two separate single conductor branch cables may be advantageous, e.g., with respect to the functional customizability of the branching unit 400. By way of example, the single conductor branch cable 418 can be used for electrical power and/or optical functionality while the single conductor branch cable 420 can be configured to provide full optical and electrical functionalities.

Figure 5:
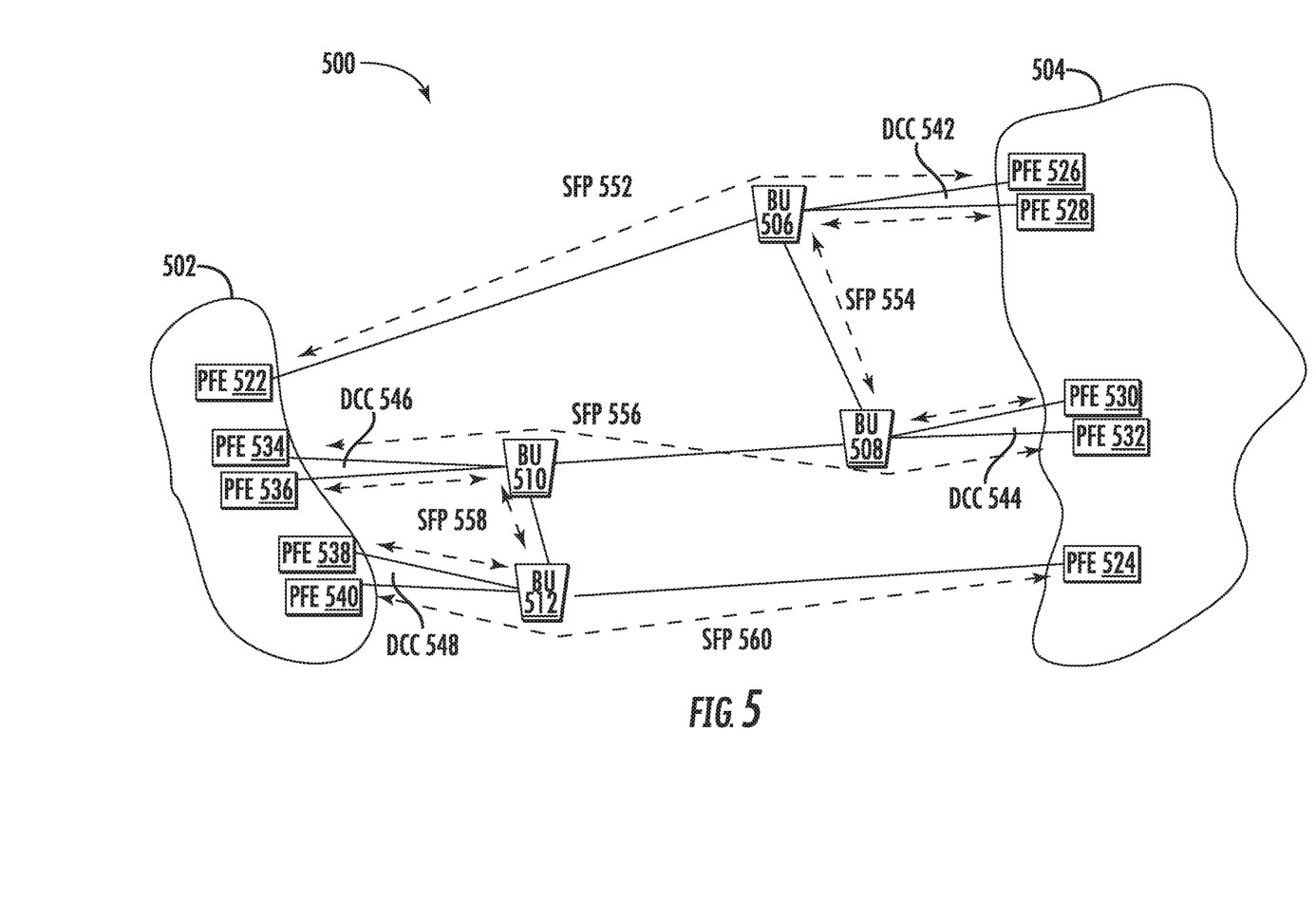
FIG. 5 illustrates an example powering architecture.

FIG. 5 illustrates an example powering architecture of an optical communication system 500 using one or more branching units according to embodiments. For ease of explanation, at least a portion of the optical communication system 500 having various power-related components is shown. The system 500 includes a series of at least five trunk cable segments of varying length that are interconnected by four different branching units (BUs) 506, 508, 510, and 512 between a first location 502 (e.g., a first landmass) and a second location 504 (e.g., a second landmass). For example, the first trunk cable of the series of trunk cables may be connected between power feed equipment (PFE) 522 and branching unit 506. The second trunk cable may be connected between branching units 506 and 508. The third trunk cable may be connected between branching units 508 and 510. The fourth trunk cable may be connected between branching units 510 and 512. The fifth trunk cable may be connected between branching unit 512 and PFE 524.

In the system 500, each of the branching units 506, 508, 510, and 512 may be configured similarly to branching unit 200, e.g., in that the branch cable connected to the branch cable port may be a dual conductor cable (DCC) and may contain therein two separately connectable power conductors. For instance, via the branching unit 506, the two separate power conductors of DCC 542 may each supply or distribute power from PFEs 526 and 528, respectively, to the outbound directions of the two connected trunk cables, e.g., the first and second trunk cables, from the branching unit 506. Moreover, the two power conductors of DCC 544 may supply or distribute power from PFEs 530 and 532 to the second and third trunk cables, respectively. DCC 546 may supply power from PFEs 534 and 536 to the third and fourth trunk cables, respectively. And DCC 548 may provide power from PFEs 538 and 540 to the fourth and fifth trunk cables, respectively.

Because each DCC in the system 500 is supplying power from two separate power sources to both outbound directions of a respective branching unit, the power architecture illustrated in FIG. 5 allows all cable connections to be adjusted for shunt fault recovery without disturbing the powering of other cables that share the segments of the DCC. As shown, the branching units 506, 508, 510, 512 may be arranged to create shunt fault paths (SFPs) 552, 554, 556, 558, and 560. Thus, when a shunt fault occurs on a specific shunt fault path, PFE voltage settings at either (or both) of the opposed PFEs on that path may be adjusted to move the effective ground connection to the location of the shunt fault damage so that all undersea equipment can be powered along that path. For example, if a shunt fault occurs on path 552, the two PFEs 522 and 526 may be adjusted to move the effective ground connection on path 552. Similarly, if a shunt fault occurs on path 556, the two PFEs 532 and 534 may be adjusted.

The powering architecture of the optical communication system 500 is advantageous at least because fault recovery activities may be performed on a specific cable or cables without affecting the other cables, which may be effective for networks, such as system 500, where there may be shorter connector cables between longer cables.

Figure 6:
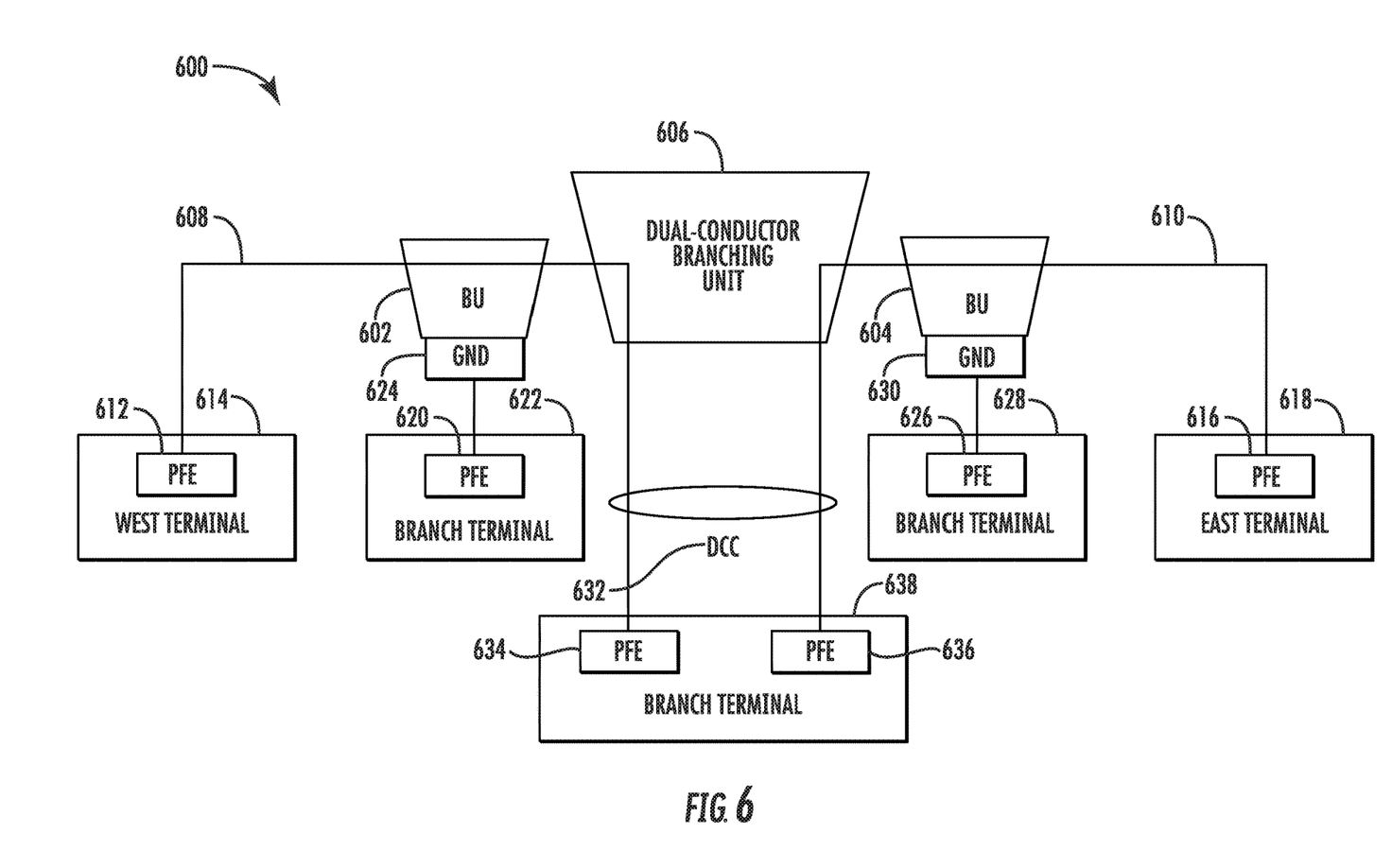
FIG. 6 illustrates an example division of a cable into powering sections.

FIG. 6 illustrates an example division of a cable into shorter powering sections according to embodiments. As shown, at least a portion of an optical communication system 600 may include two standard branching units 602, 604, and a dual-conductor branching unit 606 that connects one end of a west trunk cable 608 and one end of an east trunk cable 610. As shown, the other end of west trunk cable 608 may connect to PFE 612 at west terminal 614, and similarly, the other end of the east trunk cable 610 may connect to PFE 616 at east terminal 618. The branching units 602 and 604 may be coupled to the west and east trunk cables 608 and 610, respectively, where the branching unit 602 is arranged between the connection of dual-conductor branching unit 606 and PFE 612 and where the branching unit 604 is arranged between the connection of dual-conductor branching unit 606 and PFE 616.

As further shown, a single conductor branch cable may connect PFE 620 of branch terminal 622 to ground 624 of branching unit 602. Moreover, a single conductor branch cable may connect PFE 626 of branch terminal 628 to ground 630 of branching unit 604. The branch cable of dual-conductor branching unit 606 is different in that two power conductors are disposed therein by way of a dual conductor cable (DCC) 632. Thus, as described above, two separate PFEs 634 and 636 of branch terminal may provide or supply power to both outbound sides of the dual-conductor branching unit 606, e.g., the west trunk cable 608 and the east trunk cable 610. This configuration shown in network 600 may effectively be used to divide a long cable (e.g., the west-to-east trunk cable) into two shorter powering zones, where the electrical power, for example, is "regenerated" at branch terminal 638 using DCC 632 and the dual-conductor branching unit 606.

The powering paths from PFE 634 to PFE 612 and PFE 636 to PFE 616 may each provide recovery capabilities from shunt fault damage in those paths. Thus, an example advantage of the configuration of network 600 is that by way of the discrete powering sections (and thereby the discrete shunt fault recovery zones), shunt fault recovery and repair is simplified, more efficient, and more cost effective. It may be understood that single-end feed limitations based on maximum PFE equipment availability applies separately to the two powering sections. It may also be understood that the powering sections or zones of a given system (including the number and/or locations of the dual-conductor branching units) may be system specific, which may be based on the overall length of the system and cost-versus-powering performance tradeoff considerations by a customer or user.

Figure 7A:
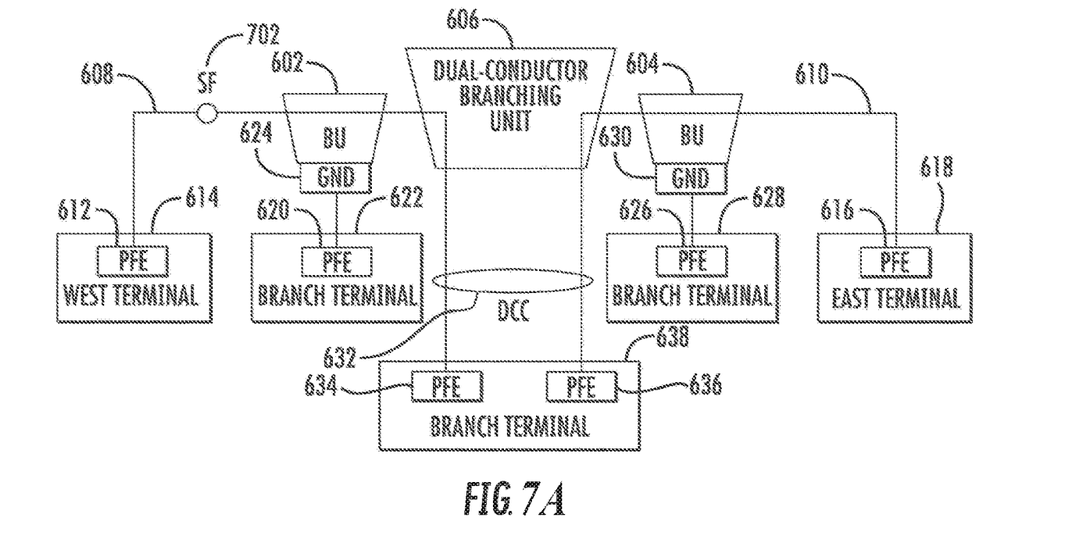
FIGS. 7A and 7B illustrate example management of a shunt fault.
Figure 7B:
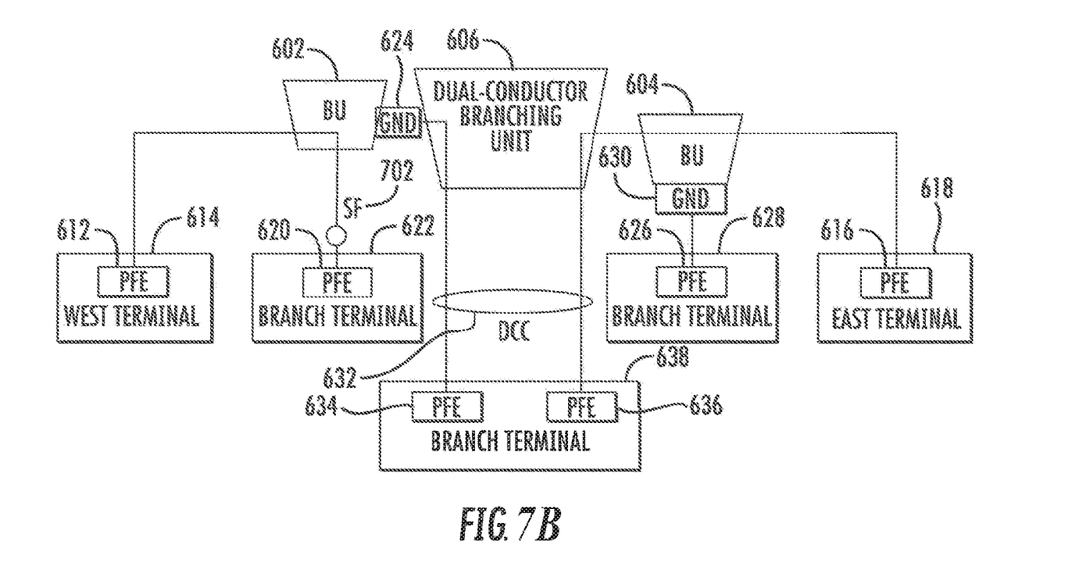

FIGS. 7A and 7B illustrate example management of a shunt fault occurring on a trunk cable according to embodiments. For ease of explanation, the optical communication system 600 and the components and functionalities thereof will be used to describe the management 700 of the shunt fault illustrated in FIGS. 7A and 7B.

As shown in FIG. 7A, a shunt fault 702 may occur on west trunk cable 608, for example, to the left side of branching unit 602. As described above, the shunt fault may be any kind of damage on the cable that creates a short circuit between the power conductor disposed in the cable and saltwater. To manage or repair the shunt fault 702, in one example, the power conductor in the west trunk cable 608 may be connected to the power conductor in the left branch cable of the dual-conductor branching unit 606 such that power to the shunt fault 702 is provided from PFEs 612 and 634. Moreover, in another example as shown in FIG. 7B, the shunt fault 702, which is located between the branching unit 602 and branch terminal 622, may be managed or repaired by connecting the power conductor in the west trunk cable 608 to the power conductor in the branch cable of branch terminal 622 such that power to the shunt fault 702 is provided from PFEs 612 and 620, while a ground connection is provided at branching unit 602 such that the power conductor segment between branching unit 602 and the dual-conductor branching unit 606 is unpowered. Other suitable management or repair examples may be envisioned.

Advantageously, the shunt fault 702 may be managed or handled in an isolated manner, e.g., in the left shunt fault recovery zone (as described above), without affecting the power or performance of the right power section of the optical communication system 600. It may be understood that a shunt fault occurring on the east trunk cable 610 (closer to the east terminal 618) may be managed or handled in a similar manner.

Figure 8A:
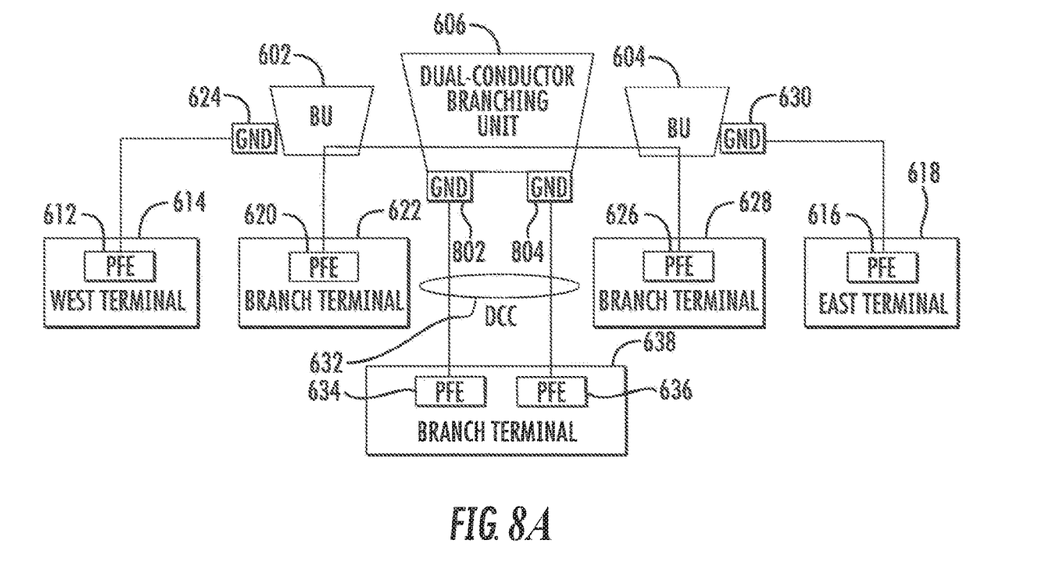
FIGS. 8A and 8B illustrate example management of a dual shunt fault.
Figure 8B:
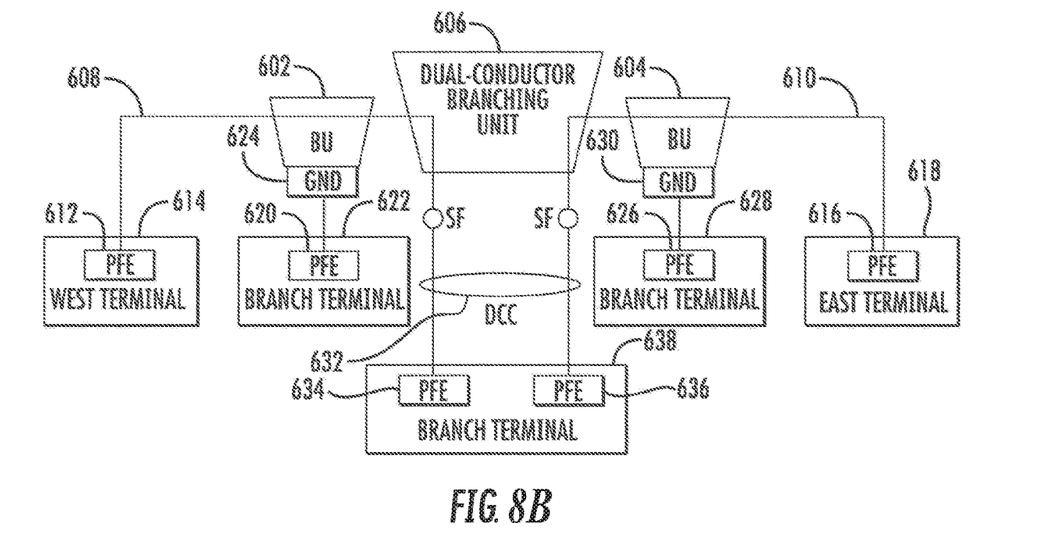

FIGS. 8A and 8B illustrate example management of a dual shunt fault occurring on a dual conductor cable according to embodiments. For ease of explanation, the optical communication system 600 and the components and functionalities thereof will be used to describe the management of the dual shunt fault illustrated in FIGS. 8A and 8B.

As illustrated in FIG. 8A, connecting the DCC 632 to grounds 802 and 804 may result in an unpowered zone between the ground connections 802 and 804 and the fault location (e.g., assuming two separate shunt faults occur on each of the power conductors of the DCC 632). The PFEs 612, 634, 616, and 636, shown in FIG. 8B, may adjust to shift the virtual ground to the fault location (e.g., on each of the power conductors of the DCC 632). For example, if the shunt faults occur on each of the power conductors of the DCC 632 in FIG. 8A, then the configuration shown in FIG. 8B may manage or repair the shunt faults by, as described above, supplying power to the shunt faults from PFEs 612, 634, 616, and 636, respectively. Advantageously, branching unit reconfiguration is not required. Accordingly, regardless of where the shunt faults occur in the optical communication system 600, the management or repair of these faults can be handled without disrupting the powering environment of the overall system.

Herein, novel and inventive apparatus and techniques for efficient optical signal amplification with greater power efficiency and with system monitoring features are disclosed. The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings.

Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A branching unit comprising:
a first port for connecting a first power conductor disposed in a first optical cable;
a second port for connecting a second power conductor disposed in a second optical cable; and
a third port for connecting a third power conductor and a fourth power conductor disposed in a branch cable,
wherein the third port includes a first sub-port and a second sub-port, and
wherein the first sub-port is configured to connect the third power conductor of the branch cable and the second sub-port is configured to connect the fourth power conductor of the branch cable.

2. The branching unit of claim 1, further comprising:
power connection circuitry,
wherein the power connection circuitry has a configuration state, and
wherein the first port, the second port, the first sub-port of the third port, and/or the second sub-port of the third port interconnect according to the configuration state.

3. The branching unit of claim 2, wherein the configuration state comprises:
the first port and the second port connected to each other, and
the first sub-port and the second sub-port connected to ground.

4. The branching unit of claim 2, wherein the configuration state comprises:
the first port and the first sub-port connected to each other, and
the second port and the second sub-port connected to each other.

5. The branching unit of claim 2, wherein the configuration state comprises:
the first port, the second port, the first sub-port, and the second sub-port connected to ground.

6. The branching unit of claim 2, wherein the configuration state comprises:
the first port and the first sub-port connected to ground, and
the second port and the second sub-port connected to each other.

7. The branching unit of claim 2, wherein the configuration state comprises:
the first port and the first sub-port connected to each other, and
the second port and the second sub-port connected to ground.

8. The branching unit of claim 1, wherein the branch cable is a dual conductor cable.

9. A branching unit comprising:
a first port for connecting a first power conductor disposed in a first optical cable;
a second port for connecting a second power conductor disposed in a second optical cable;
a third port for connecting a third power conductor disposed in a first branch cable; and
a fourth port for connecting a fourth power conductor disposed in a second branch cable.

10. The branching unit of claim 9, further comprising:
power connection circuitry,
wherein the power connection circuitry has a configuration state, and
wherein the first port, the second port, the third port, and/or the fourth port are configured to interconnect according to the configuration state.

11. The branching unit of claim 10, wherein the configuration state comprises:
(i) the first port and the second port connected to each other and
(ii) the third port and the fourth port connect to ground, or
(i) the first port and the third port connected to each other and
(ii) the second port and the fourth port connected to each other.

12. The branching unit of claim 10, wherein the configuration state comprises:
(i) the first port and the third port connected to ground and
(ii) the second port and the fourth port connected to each other, or
(i) the first port and the third port connected to each other and
(ii) the second port and the fourth port connected to ground.

13. The branching unit of claim 10, wherein the configuration state comprises:
the first port, the second port, the third port, and the fourth port connected to ground.

14. The branching unit of claim 9, wherein the first branch cable and the second branch cable are physically separate.

15. A system comprising:
a dual-conductor branching unit comprises:
a first port for connecting a first power conductor disposed in a first optical cable;
a second port for connecting a second power conductor disposed in a second optical cable; and
a third port for connecting a third power conductor and a fourth power conductor disposed in a first branch cable,
wherein the third port includes a first sub-port and a second sub-port, and
wherein the first sub-port is configured to connect the third power conductor of the first branch cable and the second sub-port is configured to connect the fourth power conductor of the first branch cable, a first branching unit comprises:
- a fourth port for connecting a fifth power conductor disposed in a third optical cable;
- a fifth port for connecting the first power conductor disposed in the first optical cable; and
- a sixth port for connecting a sixth power conductor disposed in a second branch cable, and a second branching unit comprises:
- a seventh port for connecting the second power conductor disposed in the second optical cable;
- an eighth port for connecting a seventh power conductor disposed in a fourth optical cable; and
- a ninth port for connecting an eighth power conductor disposed in a third branch cable.

16. The system of claim 15, wherein the fourth port and the sixth port of the first branching unit are connected to each other, wherein the fifth port of the first branching unit is connected to ground, and wherein the first port and the first sub-port of the third port of the dual-conductor branching unit are connected to each other.

17. The system of claim 15, wherein the fourth port and the fifth port of the first branching unit are connected to each other, wherein the sixth port of the first branching unit is connected to ground, wherein the seventh port and the eighth port of the second branching unit are connected to each other, wherein the ninth port of the second branching unit is connected to ground, wherein the first port and the first sub-port of the third port of the dual-conductor branching unit are connected to each other, and wherein the second port and the second sub-port of the third port of the dual-conductor branching unit are connected to each other.

18. The system of claim 15, wherein the first branch cable is a dual conductor cable.

* * * * *

UNITED STATES PATENT AND TRADEMARK OFFICE
CERTIFICATE OF CORRECTION

PATENT NO. : 10,777,336 B1
APPLICATION NO. : 16/382761
DATED : September 15, 2020
INVENTOR(S) : Lara Denise Garrett et al.

It is certified that error appears in the above-identified patent and that said Letters Patent is hereby corrected as shown below:

In the Specification

Column 8, Line 23: Please delete "700"

Signed and Sealed this
Fifth Day of January, 2021

Andrei Iancu
*Director of the United States Patent and Trademark Office*